(12) United States Patent
Jiang et al.

(10) Patent No.: US 11,769,333 B2
(45) Date of Patent: Sep. 26, 2023

(54) METHOD AND SYSTEM FOR DETECTING BLOCK FALLING DISASTER IN A TUNNEL BASED ON VISUAL AND MECHANICAL PERCEPTION

(71) Applicant: SHANDONG UNIVERSITY, Shandong (CN)

(72) Inventors: Qi Jiang, Jinan (CN); Qingyu Du, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 200 days.

(21) Appl. No.: 17/328,191

(22) Filed: May 24, 2021

(65) Prior Publication Data

US 2022/0121863 A1  Apr. 21, 2022

(30) Foreign Application Priority Data

Oct. 21, 2020 (CN) .......................... 202011130560.0

(51) Int. Cl.
*G06V 20/58* (2022.01)
*G06T 7/62* (2017.01)
(Continued)

(52) U.S. Cl.
CPC ........... *G06V 20/58* (2022.01); *G01M 5/0025* (2013.01); *G01M 5/0033* (2013.01);
(Continued)

(58) Field of Classification Search
CPC ...... G06V 10/25; G06V 10/764; G06V 10/82; G06T 7/0002; G06T 2207/30108;
(Continued)

(56) References Cited

U.S. PATENT DOCUMENTS

| 2008/0177482 A1* | 7/2008 | Kishida ................ G01M 11/085 374/E11.015 |
| 2015/0210174 A1* | 7/2015 | Settele .................... B60L 53/14 320/109 |

(Continued)

OTHER PUBLICATIONS

Redmon J, Divvala S, Girshick R, Farhadi A. You only look once: Unified, real-time object detection. InProceedings of the IEEE conference on computer vision and pattern recognition 2016 (pp. 779-788). (Year: 2016).*

(Continued)

*Primary Examiner* — Clifford Hilaire
(74) *Attorney, Agent, or Firm* — Oliff PLC

(57) ABSTRACT

A method and system for detecting a tunnel block falling disease based on visual and mechanical perception includes: capturing tunnel inner wall images, and preliminarily identifying a block falling disease using a trained first neural network model; constructing a circle based on a center which is the center position of the suspected disease determined in the preliminary identification process, dividing the circle equally through a plurality of diameters, pressing against the center of the suspected block falling disease in a pose perpendicular to the inner wall of the tunnel, moving in the diameter directions within the range of the suspected block falling disease, recording the displacement, and acquiring force and torque at the suspected block falling disease position during the movement; and determining the suspected tunnel block falling disease based on the acquired displacement, force and torque, using a second neural network model, and determining the tunnel block falling disease.

16 Claims, 2 Drawing Sheets

(51) Int. Cl.
*G06T 7/73* (2017.01)
*G06T 7/246* (2017.01)
*G06V 20/64* (2022.01)
*G01M 5/00* (2006.01)
*H04N 7/18* (2006.01)
*G06F 18/214* (2023.01)

(52) U.S. Cl.
CPC ........ *G01M 5/0075* (2013.01); *G01M 5/0091* (2013.01); *G06F 18/2148* (2023.01); *G06T 7/251* (2017.01); *G06T 7/62* (2017.01); *G06T 7/75* (2017.01); *G06V 20/653* (2022.01); *H04N 7/188* (2013.01); *G06T 2207/20084* (2013.01)

(58) Field of Classification Search
CPC .................... G06T 7/0008; G06T 7/11; G06T 2207/20084; G06T 2207/20081; G01N 21/88; G01N 21/954; G01N 2021/8861; G01N 2223/646; G01N 2223/628; G01N 22/02; G01N 25/72; G01N 29/069; G01N 29/265; G01N 29/4481; B25J 13/085
See application file for complete search history.

(56) References Cited

U.S. PATENT DOCUMENTS

| | | | |
|---|---|---|---|
| 2016/0227126 A1* | 8/2016 | Akashi | G01M 3/38 |
| 2019/0332881 A1* | 10/2019 | Hoshino | G06F 18/2413 |
| 2020/0090321 A1* | 3/2020 | Xu | G06Q 10/10 |
| 2020/0279364 A1* | 9/2020 | Sarkisian | G06F 16/252 |
| 2021/0232800 A1* | 7/2021 | Wohlfeld | G06F 18/2155 |
| 2021/0281748 A1* | 9/2021 | Nogami | G06V 10/44 |

OTHER PUBLICATIONS

Xue Y, Li Y. A fast detection method via region-based fully convolutional neural networks for shield tunnel lining defects. Computer-Aided Civil and Infrastructure Engineering. Aug. 2018;33(8):638-54. (Year: 2018).*

Yu SN, Jang JH, Han CS. Auto inspection system using a mobile robot for detecting concrete cracks in a tunnel. Automation in construction. May 1, 2007;16(3):255-61. (Year: 2007).*

* cited by examiner

Input　　Hidden layer　　Output layer

METHOD AND SYSTEM FOR DETECTING BLOCK FALLING DISASTER IN A TUNNEL BASED ON VISUAL AND MECHANICAL PERCEPTION

FIELD OF THE INVENTION

The present invention belongs to the technical field of tunnel disaster detection, and specifically relates to a method and a system for detecting a block falling disaster in a tunnel based on visual and mechanical perception.

BACKGROUND OF THE INVENTION

The statement of this section merely provides background art information related to the present invention, and does not necessarily constitute the prior art.

At present, many tunnels suffer from disasters of block falling, cracking, deformation and water seepage. The block falling disaster has a greatest impact on traffic quality. Once the block falling disaster occurs, it is very likely to cause great damage to vehicles running in the tunnel, and the driving safety in the tunnel is greatly threatened.

As the inventor knows, the current daily detection of the tunnel block falling disaster mostly depends on manual field investigation. The worker looks over the inner wall of a tunnel with naked eyes to check whether there are ring cracks. If a ring crack is discovered, the worker uses a rod to press against the ring crack, moves all around, and then determines based on experience whether a block falling disaster will occur here. If the block falling disaster is determined, the ring crack is immediately arranged to be repaired. For the detection of the part above the arch waist or the arch apex, a scaffold or a high-altitude lifting platform car is required, then the inspector can contact the inner wall of the tunnel at close distance, and use a flashlight to check the disaster at the arch waist or the arch apex with the naked eyes. The accuracy of the block falling disaster detected by such method is low, and missing detection is easily caused. During detection, the personnel safety is poor, and the detection efficiency is low.

SUMMARY OF THE INVENTION

In order to solve the above problems, the present invention proposes a method and system for detecting a tunnel block falling disaster based on visual and mechanical perception, which can quickly detect the tunnel block falling disaster and achieve the effect of quickly and accurately detecting the falling disaster.

According to some embodiments, the present invention adopts the following technical solutions:

A method for detecting a tunnel block falling disaster based on visual and mechanical perception, including the following steps:

capturing tunnel inner wall images, and preliminarily identifying a block falling disaster using a trained first neural network model;

constructing a circle based on a center which is the center position of the suspected block falling disaster determined in the preliminary identification process, dividing the circle equally through a plurality of diameters, pressing against the center of the suspected block falling disaster in a pose perpendicular to the inner wall of the tunnel, moving in the diameter directions within the range of the suspected block falling disaster, recording the displacement, and acquiring force and torque at the suspected block falling disaster position during the movement; and further determining the suspected tunnel block falling disaster based on the acquired displacement, force and torque, using a second neural network model, and finally determining whether the tunnel has the block falling disaster according to a determination factor constructed.

As an optional implementation, the first neural network model is a YOLO neural network model, including 7 convolutional layers and 5 pooling layers, all the convolutional layers employ 3×3 convolution kernels, a maximum pooling layer follows first six convolutional layers to reduce dimensionality and parameters, and meanwhile each layer of input is normalized.

As an optional implementation, the second neural network model is a BP neural network model, including an input layer, a hidden layer, and an output layer.

As an optional implementation, the specific process of further determining the suspected tunnel block falling disaster based on the acquired displacement, force and torque, using a second neural network model, and finally determining whether the tunnel has the block falling disaster includes:

based on the data measured in a health state of the inner wall of the tunnel, calculating a residual matrix in a reference state, constructing a tunnel block falling disaster determination factor, and calculating a tunnel block falling disaster damage determination threshold; and for a disaster to be determined at certain place, constructing a data sample set of force and torque at the suspected block falling disaster position of the tunnel using the detected data; obtaining a residual matrix in the state to be determined using the second neural network model trained in the reference state, calculating a tunnel block falling disaster determination factor vector in the state to be determined, determining whether the tunnel block falling disaster determination factor vector in the state to be determined exceeds a threshold, and if exceeding, then determining there is the block falling disaster.

In the present invention, pressing against the center of the suspected block falling disaster in a pose perpendicular to the inner wall of the tunnel can be implemented by a mechanical actuator, such as a mechanical arm, a manipulator, or a lifting rod. The means of pressing and moving shall fall into the protection scope of the present invention.

Of course, relevant acquisition or detection equipment can be arranged at the upper end of the mechanical actuator.

A system for detecting a tunnel block falling disaster based on visual and mechanical perception, including a mobile platform and a control system, wherein:

a plurality of camera devices are arranged on the mobile platform for capturing tunnel inner wall images;

a positioning mechanism is arranged on the mobile platform for positioning the mobile platform;

a six-axis mechanical arm is arranged on the mobile platform, the six-axis mechanical arm is configured to move or stop at a specified position, and a six-dimensional force sensor is arranged at the end of the six-axis mechanical arm for acquiring force and torque; and the control system is configured to receive the tunnel inner wall images and the displacement, force and torque information about the end of the six-axis mechanical arm, and preliminarily identify a block falling disaster using a trained first neural network model based on the images information; further determine the suspected tunnel block falling disaster based on the acquired displacement, force and torque, using a second neural network model, and finally determine the tunnel block falling disaster.

As an optional implementation, a lifting platform is arranged on the mobile platform, and the six-axis mechanical arm is arranged on the lifting platform.

As an optional implementation, several auxiliary light sources are arranged on the mobile platform.

As an optional implementation, the control system includes a control center and a control and operation integrated system, including a central control motherboard, a synchronization controller, an industrial computer, a memory, and a display; the central control motherboard is used as a core of data analysis, conversion and transmission, the memory is used to store data, and the display is used to display real-time detected image flow; the synchronization controller is used to receive a trigger signal and sensor data, meanwhile transmit the trigger signal to an image capture device to trigger the capture of images, and transmit the data to the memory; the memory is used to store the image and the sensor data; and the industrial computer is used to receive the data and store the data in the memory.

A working method based on the above system, including the following steps:
  the mobile platform moves in the tunnel, the camera devices capture images of respective positions of the inner wall of the tunnel and transmit the images to the control system, and the control system preliminarily identifies a block falling disaster using the trained first neural network model;
  the six-axis mechanical arm constructs a circle based on a center which is the center position of the suspected block falling disaster determined in the preliminary identification process, divides the circle equally through a plurality of diameters, presses against the center of the suspected block falling disaster in a pose perpendicular to the inner wall of the tunnel, moves in the diameter directions within the range of the suspected block falling disaster, records the displacement, and acquires force and torque at the suspected block falling disaster position during the movement through the six-dimensional force sensor; and
  the control system further determines the suspected tunnel block falling disaster based on the acquired displacement, force and torque using the second neural network model, and finally determines the tunnel block falling disaster.

As an optional implementation, measures the position of the suspected disaster by 3D cameras, calculates the distance between the end of the six-axis mechanical arm and the suspected disaster, and raises the lifting platform till the distance between the six-axis mechanical arm and the suspected disaster reaches its operation range.

Compared with the prior art, the present invention has the following beneficial effects:

The present invention uses images captured by camera devices to preliminarily determine the position of a suspected disaster, and then operates again through the six-axis mechanical arm, thereby saving time and improving accuracy. Meanwhile, the captured images are input to a trained YOLO neural network to preliminarily identify a suspected block falling disaster, then the position of the suspected disaster is detected by 3D cameras, the distance between the mechanical arm and the suspected disaster is calculated, and the lifting platform is raised till the distance between the mechanical arm and the suspected disaster reaches its operation range; therefore, the control process is simple and easy to implement.

The present invention constructs a tunnel block falling disaster determination factor based on displacement, force and torque through a BP neural network, which can automatically determine whether the tunnel has a block falling disaster, with high determination result accuracy.

In order to make the above objectives, features and advantages of the present invention comprehensible, preferred embodiments accompanied with figures are described in detail below.

BRIEF DESCRIPTION OF THE DRAWINGS

The accompanying drawings constituting a part of the present invention are used for providing a further understanding on the present invention, and the schematic embodiments of the present invention and the descriptions thereof are used for interpreting the present invention, rather than constituting improper limitations to the present invention.

DETAILED DESCRIPTION OF EMBODIMENTS

The present invention will be further illustrated below in conjunction with the accompanying drawings and embodiments.

It should be pointed out that the following detailed descriptions are all exemplary and aim to further illustrate the present invention. Unless otherwise specified, all technical and scientific terms used in the descriptions have the same meanings generally understood by those of ordinary skill in the art of the present invention.

It should be noted that the terms used herein are merely for describing specific embodiments, but are not intended to limit exemplary embodiments according to the present invention. As used herein, the singular form is also intended to include the plural form unless otherwise indicated in the context. In addition, it should be understood that when the terms "contain" and/or "include" are used in the description, they are intended to indicate the presence of features, steps, operations, devices, components and/or combinations thereof.

Figure 1:
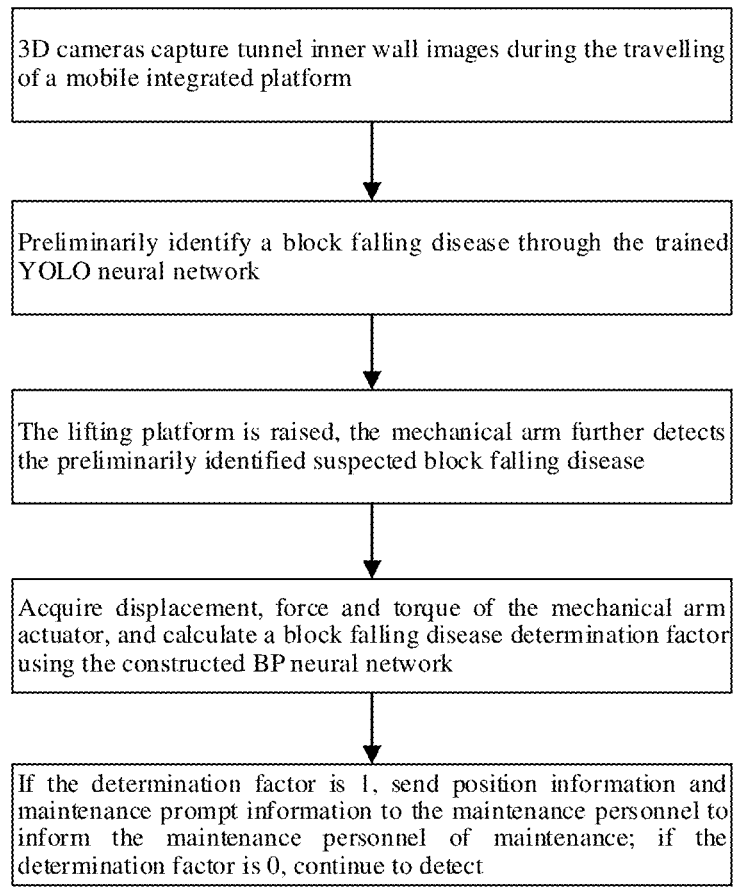
FIG. 1 is a schematic flowchart of a method of the present invention.
Figure 2:
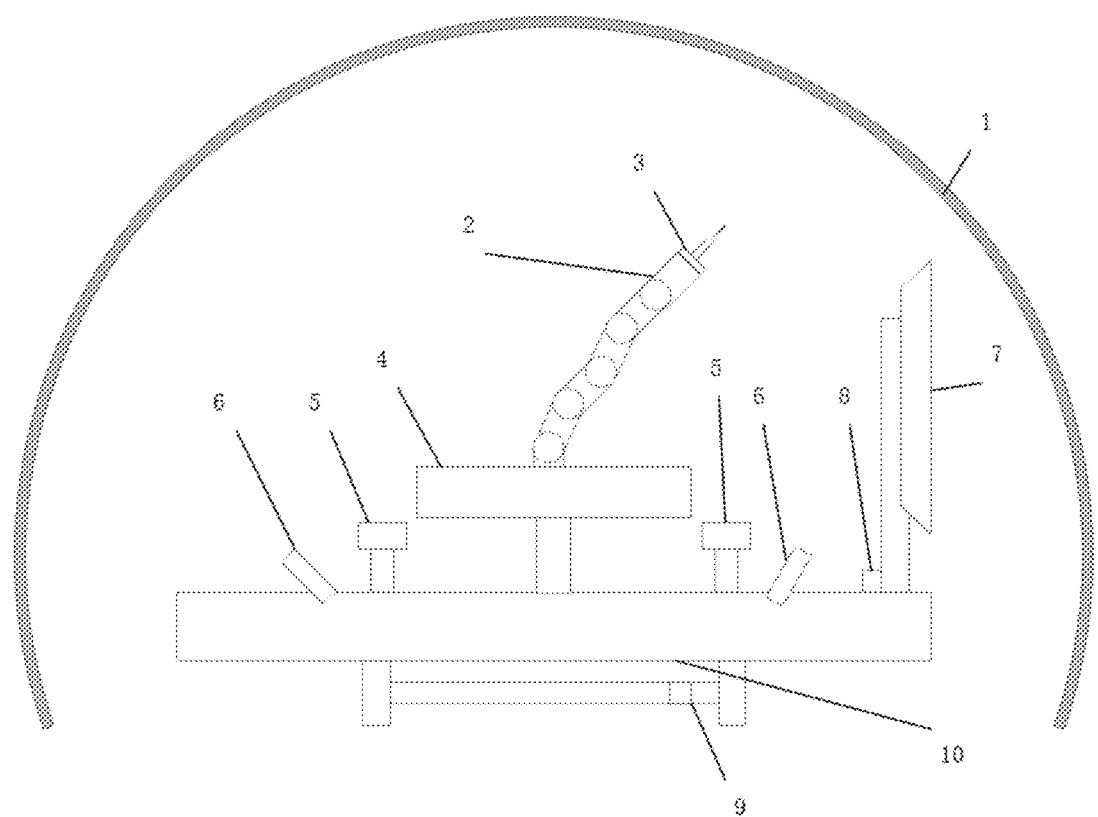
FIG. 2 is a schematic structural diagram of a system of the present invention.
Figure 3:
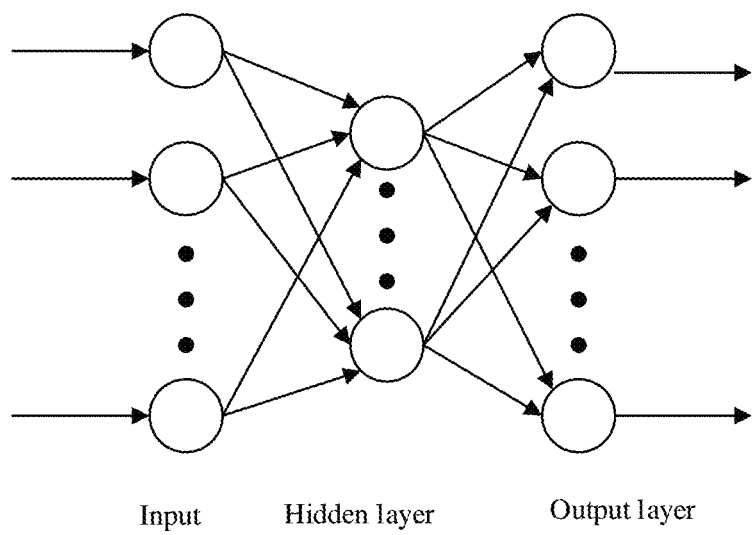
FIG. 3 is a structural diagram of a BP neural network of the present invention.

As shown in FIG. 2, a system for detecting a tunnel block falling disaster based on visual and mechanical perception in this embodiment includes a control and operation integrated system (7), a six-axis mechanical arm (2), a positioning system (8, 9), a mobile integrated platform (10), a lifting platform (4), 3D cameras (5), and auxiliary light sources (6).

The control and operation integrated system includes a central control motherboard, a synchronization controller, an industrial computer, a memory, and a display. the central control motherboard is used as a core of data analysis, conversion and transmission; the display is used to display real-time detected image flow; the synchronization controller is used to receive a trigger signal and sensor data, transmit the trigger signal to an image capture device to trigger the capture of images, and transmit the data to the memory; the memory is used to store the image and the sensor data; and the industrial computer is used to receive the data and store the data in the memory.

Of course, the control and operation integrated system further includes a necessary power supply system.

In order to ensure that force and torque data in multiple directions can be acquired, a six-axis mechanical arm equipped with a six-dimensional force sensor (3) is employed.

In this embodiment, the positioning system consists of a milemeter (9) and an inertial navigation unit (8), the milemeter is connected to an axle, and the inertial navigation unit is installed on the platform.

In this embodiment, the lifting platform is used to carry and raise the mechanical arm. A lateral guide rail is designed on the lifting platform, which enables the mechanical arm to reach any position of the cross section of a tunnel. Two 3D cameras are respectively arranged on the left and right sides.

In this embodiment, the auxiliary light sources employ LED strobe lights, which are uniformly distributed on two sides of the 3D cameras to illuminate the internal environment of the tunnel.

Potential block falling disaster (that is, ring crack) images are captured to train a YOLO neural network, images captured by the 3D cameras are input to the trained YOLO neural network to preliminarily identify a suspected block falling disaster, then the position of the suspected disaster is detected by the 3D cameras after the suspected block falling disaster is identified, the distance between the mechanical arm and the suspected disaster is calculated, and the lifting platform is raised till the distance between the mechanical arm and the suspected disaster and reaches its operation range. A circle is constructed on the surface of the inner wall of the tunnel based on a center which is the center of the suspected disaster, the circle is equally divided through N diameters, a mechanical arm actuator initially presses against the center of the suspected disaster in a pose perpendicular to the inner wall of the tunnel and stops after moving front and back two times along these N diameters within the range of the suspected disaster, the displacement of the tail end of the mechanical arm actuator is recorded, the maximum and minimum values of force and torque at the suspected disaster during the movement of the actuator are acquired by the six-dimensional force sensor installed at the tail end of the mechanical arm actuator, and a tunnel block falling disaster determination factor based on displacement, force and torque is constructed by a BP neural network; when the value of the determination factor is 0, the tunnel does not have a block falling disaster; and when the value of the determination factor is 1, the tunnel may have the block falling disaster, and maintenance personnel are required for further maintenance, and position information and maintenance prompt information are sent to the maintenance personnel.

The YOLO neural network designed in the present invention employs a Darknet19 model as a basic feature extraction network, and includes 19 convolutional layers and 5 Max-pooling layers. Considering that the calculation capacity of the present chip onboard vehicle is limited, and the convolutional neural network of the same magnitude is difficult to meet the real-time requirement, therefore the original network is properly clipped in the present invention, and the obtained real-time detection network model for the tunnel block falling disaster is shown in the following table:

TABLE 1

Real-time detection network model for tunnel block falling disaster

| Layer number | Type | Number of convolution kernels | Size/step length of convolution kernel/pooling kernel | Output size |
|---|---|---|---|---|
| 0 | Input | — | — | 416 × 416 × 3 |
| 1 | Conv1 | 16 | 3 × 3/1 | 416 × 416 × 16 |
| 2 | Max-Pooling1 | — | 2 × 2/2 | 208 × 208 × 16 |
| 3 | Conv2 | 32 | 3 × 3/1 | 208 × 208 × 32 |
| 4 | Max-Pooling2 | — | 2 × 2/2 | 104 × 104 × 32 |
| 5 | Conv3 | 64 | 3 × 3/1 | 104 × 104 × 64 |
| 6 | Max-Pooling3 | — | 2 × 2/2 | 52 × 52 × 64 |
| 7 | Conv4 | 128 | 3 × 3/1 | 52 × 52 × 128 |
| 8 | Max-Pooling4 | — | 2 × 2/2 | 26 × 26 × 128 |
| 9 | Conv5 | 256 | 3 × 3/1 | 26 × 26 × 256 |
| 10 | Max-Pooling5 | — | 1 × 2/2 | 13 × 13 × 256 |
| 11 | Conv6 | 512 | 3 × 3/1 | 13 × 13 × 512 |
| 12 | Conv7 | 128 | 3 × 3/1 | 13 × 13 × 128 |
| 13 | Output1 | — | — | 13 × 13 × 18 |

Table 1 shows a backbone network of the network model of the present invention. It can be seen from the above table that the network model built herein has a total of 7 convolutional layers and 5 pooling layers, nearly half of those of a YOLOv2 network structure. The convolutional layers in the network all employ 3×3 convolution kernels, and a maximum pooling layer follows first six convolutional layers to reduce dimensionality and parameters. Meanwhile, each layer of input is normalized to increase network calculation and convergence speeds.

The tunnel block falling disaster determination factor based on displacement, force and torque is constructed by the BP neural network, a data sample set at the suspected tunnel block falling disaster is constructed, and the BP neural network is trained with m sample points. The training set is shown as follows:

$$P_1 = ([\rho_1 \rho_2 \ldots \rho_g \ldots \rho_n]^T)_{n \times 4} (g \in (1,2,\ldots,n)) \quad (1)$$

$$\chi_1 = ([x_1 x_2 \ldots x_g \ldots x_n]^T)_{n \times 4} (g \in (1,2,\ldots,n)) \quad (2)$$

$$P = ([P_1 P_2 \ldots P_r \ldots P_m]^T)_{m \times 4} (r \in (1,2,\ldots,m)) \quad (3)$$

$$X = ([\chi_1 \chi_2 \ldots \chi_r \ldots \chi_m]^T)_{m \times 4} (r \in (1,2,\ldots,m)) \quad (4)$$

In (1), $\rho_g$ is a vector constituted by the maximum and minimum values of force and torque borne by the mechanical arm actuator during the movement along the g-th diameter of the sample at certain place, and is defined as follows:

$$\rho_g = [F_{min} F_{max} M_{min} M_{max}] \quad (5)$$

In the equation, $F_{min}$, $F_{max}$, $M_{min}$, and $M_{max}$ are the maximum and minimum values of force and torque borne by the mechanical arm actuator.

In (2), $x_g$ is a displacement sample vector of the mechanical arm actuator at the sample during the movement along the g-th diameter, and is defined as follows:

$$x_g = [X_x X_y X_z 0] \quad (6)$$

P and X are input and output data sets of the training set of m samples.

In order to establish a relationship between the displacement, force and torque and the tunnel block falling disaster using the BP neural network, the data sets of the training set acquired at m samples are divided as follows:

$$Q = \begin{bmatrix} [P_1 \ P_2 \ \cdots \ P_r \ \cdots \ P_m]^T \\ [\chi_1 \ \chi_2 \ \cdots \ \chi_r \ \cdots \ \chi_m]^T \end{bmatrix}_{2m \times 4} = \begin{bmatrix} P_{input} \\ X_{output} \end{bmatrix}_{2m \times 4} \quad (7)$$

In the equation, $P_{input}$ is the input layer sample set of the BP neural network training set, and $X_{output}$ is the output layer sample set of the BP neural network training set.

The BP neural network consists of an input layer, a hidden layer, and an output layer. The three-layer BP neural network can approximate any nonlinear function, the increase in error precision can be obtained by designing the number of neurons in the hidden layer, and the number of neurons in the hidden layer is determined by the following empirical equation:

$$k = \sqrt{2n} + a \quad (8)$$

In the equation, k is the number of neurons in the hidden layer, 2n is the sum of neurons in the input layer and the output layer, and a is a constant between [1, 10]. The input layer and output layer sample sets are substituted into the BP neural network for training.

$\delta$ is a residual matrix of the BP neural network, as shown in the following equations:

$$\delta_r = [\delta_1 \delta_2 \ldots \delta_z \ldots \delta_n]_{n \times 4} (z \in (1,2,\ldots,n)) \quad (9)$$

$$\delta_r^T = \chi_{output} - \hat{\chi}_{output} \quad (10)$$

In the equation, $\chi_{output}$ is an output vector of the r-th sample point of the BP neural network, and $\hat{\chi}_{output}$ is an estimated matrix of $\chi_{output}$ obtained using the trained BP neural network.

The residual matrix $\delta_r$ in a reference state is calculated using the data measured in a health state of the inner wall of the tunnel, and the following tunnel block falling disaster determination factor is constructed:

$$d = \{d_1, d_2, \ldots, d_z, \ldots, d_n\} (z \in (1,2,\ldots,n)) \quad (11)$$

In the equation, $d_z$ is the tunnel block falling disaster determination factor of the mechanical arm actuator in the z-th diameter direction in the reference state, and is defined as follows:

$$d_z = \sqrt{(\delta_z^T - \mu^T)^T (\theta)^{-1} (\delta_z - \mu)} \quad (12)$$

In the equation, $\delta_z$ is the z-th column of the residual matrix $\delta_r$ in the reference state, $\mu$ and $\theta$ are respectively a mean vector and a covariance matrix of the residual matrix $\delta_r$, which are defined as follows:

$$\mu = \frac{1}{n} \sum_{z=1}^{n} \delta_z \quad (13)$$

$$\theta = \frac{1}{n-1} \sum_{z=1}^{n} (\delta_z - \mu)(\delta_z - \mu)^T \quad (14)$$

For a disaster to be determined at certain place, a data sample set q of force and torque at the suspected block falling disaster position of the tunnel is constructed using the detected data, as shown in the following equation, $$q = \begin{bmatrix} [\rho_1' \ \rho_2' \ \cdots \ \rho_w' \ \cdots \ \rho_n']^T \\ [x_1' \ x_2' \ \cdots \ x_w' \ \cdots \ x_n']^T \end{bmatrix}_{2n \times 4} = \begin{bmatrix} \rho_{input}' \\ x_{output}' \end{bmatrix}_{2n \times 4} \quad (15)$$

The residual matrix $\delta'$ in the state to be determined is obtained using the BP neural network trained in the reference state, $$\delta'^T = x'_{output} - \hat{x}'_{output} \quad (16)$$

In the equation, $x'_{output}$ is the output of the BP neural network in the state to be determined, that is, the displacement of the mechanical arm; and output $\hat{x}'_{output}$ is an estimated matrix of the output obtained using the trained BP neural network in the state to be determined. On this basis, a tunnel block falling disaster determination factor vector d' in the state to be determined is calculated, $$d' = \{d'_1, d'_2, \ldots, d'_w, \ldots, d'_n\} (w \in (1,2,\ldots,n)) \quad (17)$$

$$d'_w = (\delta_w'^T - \mu^T)^T (\theta)^{-1} (\delta'_w - \mu) \quad (18)$$

In the equation, $d'_w$ is the w-th element of d', and $\delta'_w$ is the w-th column of the residual matrix $\delta'$ in the state to be determined.

In the health state of the tunnel, a tunnel block falling disaster damage determination threshold is calculated. On this basis, a disaster determination decision is made for the tunnel by calculating the disaster determination factor exceeding the threshold:

In the health state, the method for calculating the tunnel block falling disaster determination threshold is:

$$\lambda = [d_1, d_2, \ldots, d_z, \ldots, d_n]_{0.95} (z \in (1,2,\ldots,n)) \quad (19)$$

In the equation, $\lambda$ is the tunnel block falling disaster determination threshold, $[\ ]_{0.95}$ operator represents a 95% confidence probability value, and $d_z$ is a determination factor at the suspected block falling disaster position during the mechanical arm actuator moves in the z-diameter direction.

Whether the tunnel has a possibility of block falling disaster is determined using the disaster determination threshold $\lambda$ established in the health state of the tunnel, that is:

$$T_w = \begin{cases} 1, & d'_w \geq \lambda \\ 0, & d'_w < \lambda \end{cases} \quad (20)$$

In the equation, $T_w$ is a tunnel block falling disaster determination indicator, w is any diameter direction in the state to be determined, and $d'_w$ is the tunnel block falling disaster determination factor in the w-th diameter direction in the state to be determined. When $T_w$ is 1, it indicates that the tunnel may have the block falling disaster, and maintenance personnel are required for further maintenance. When $T_w$ is 0, it indicates that the tunnel does not have any block falling disaster.

A person skilled in the art should understand that the embodiments of the present invention may be provided as a method, a system, or a computer program product. Therefore, the present invention may be in the form of a full hardware embodiment, a full software embodiment, or an embodiment combining software and hardware. In addition, the present invention may be in the form of a computer program product implemented on one or more computer available storage media (including but not limited to a disk memory, a CD-ROM, an optical memory, and the like) including computer available program codes.

The present invention is described with reference to flow diagrams and/or block diagrams of the method, equipment (system), and the computer program product in the embodiments of the present invention. It should be understood that computer program instructions can implement each process and/or block in the flowcharts and/or block diagrams and a combination of processes and/or blocks in the flowcharts and/or block diagrams. These computer program instructions may be provided to a general-purpose computer, a dedicated computer, an embedded processor, or a processor of other programmable data processing equipment to generate a machine, so that a device configured to implement functions specified in one or more processes in the flowcharts and/or one or more blocks in the block diagrams is generated by using instructions executed by the general-purpose computer or the processor of other programmable data processing equipment.

These computer program instructions may also be stored in a computer readable memory that can guide a computer or other programmable data processing equipment to work in a specific manner, so that the instructions stored in the computer readable memory generate a product including an instruction device, where the instruction device implements functions specified in one or more processes in the flowcharts and/or one or more blocks in the block diagrams.

These computer program instructions may also be loaded into a computer or other programmable data processing equipment, so that a series of operation steps are performed on the computer or other programmable data processing device to generate processing implemented by a computer, and instructions executed on the computer or other programmable data processing equipment provide steps for implementing functions specified in one or more processes in the flowcharts and/or one or more blocks in the block diagrams.

Described above are merely preferred embodiments of the present invention, and the present invention is not limited thereto. Various modifications and variations may be made to the present invention for those skilled in the art. Any modification, equivalent substitution or improvement made within the spirit and principle of the present invention shall fall into the protection scope of the present invention.

The specific embodiments of the present invention are described above with reference to the accompanying drawings, but are not intended to limit a protection scope of the present invention. Those skilled in the art should understand that various modifications or variations that can be made by those skilled in the art without contributing creative labor are still within the protection scope of the present invention on the basis of the technical solution of the present invention.

The invention claimed is:

1. A method for detecting a block falling disaster in a tunnel based on visual and mechanical perception, the method comprising:
   capturing tunnel inner wall images, and preliminarily identifying a suspected block falling disaster in the tunnel using a trained first neural network model;
   constructing a circle by taking a center of a position of the suspected block falling disaster determined in the preliminary identification process as a center of the circle, dividing the circle equally through a plurality of diameters, pressing against the center of the position of the suspected block falling disaster in a pose perpendicular to the inner wall of the tunnel, moving in directions of the plurality of diameters within a range of the suspected block falling disaster, recording displacements, and acquiring force and torque at the position of the suspected block falling disaster during the movement; and
   further judging, using a second neural network model, the suspected block falling disaster based on the recorded displacements and the acquired force and torque, and finally determining the block falling disaster in the tunnel.

2. The method for detecting the block falling disaster in the tunnel based on visual and mechanical perception according to claim 1, wherein the trained first neural network model is a YOLO neural network model, comprising 7 convolutional layers and 5 pooling layers, all the convolutional layers employ 3×3 convolution kernels, a maximum pooling layer follows first six convolutional layers to reduce dimensionality and parameters, and meanwhile each layer of input is normalized.

3. The method for detecting the block falling disaster in the tunnel based on visual and mechanical perception according to claim 1, wherein the second neural network model is a BP neural network model, comprising an input layer, a hidden layer, and an output layer.

4. The method for detecting the block falling disaster in the tunnel based on visual and mechanical perception according to claim 1, wherein a process of the further judging, using the second neural network model, the suspected block falling disaster based on the recorded displacements, and the acquired force and torque, and finally determining the block falling disaster in the tunnel specifically comprises:
   based on data measured in a health state of an inner wall of the tunnel, calculating a residual matrix in a reference state, constructing a determination factor of the block falling disaster, and calculating a damage determination threshold of the block falling disaster; and
   for a place to be determined whether there is the block falling disaster, constructing a data sample set of force and torque at the position of the suspected block falling disaster in the tunnel using the detected data; obtaining a residual matrix in a state of to be determined using the second neural network model trained in the reference state, calculating a vector of the determination factor of the block falling disaster in the tunnel in the state of to be determined, determining whether the vector exceeds the threshold, and if exceeding, then determining there is the block falling disaster in the place.

5. A system for detecting a block falling disaster in a tunnel based on visual and mechanical perception, the system comprising a mobile platform and a control system, wherein:
   a plurality of camera devices are arranged on the mobile platform for capturing tunnel inner wall images;
   a positioning mechanism is arranged on the mobile platform for positioning the mobile platform;
   a six-axis mechanical arm is arranged on the mobile platform, the six-axis mechanical arm is configured to move or stop at a specified position, and a six-dimensional force sensor is arranged at an end of the six-axis mechanical arm for acquiring force and torque; and
   the control system is configured to receive the tunnel inner wall images and information of a displacement of the six-axis mechanical arm, the acquired force and torque about the end of the six-axis mechanical arm, and preliminarily identify a suspected block falling disaster using a trained first neural network model based on information of the images; further judging, using a second neural network model, the suspected block falling disaster based on the information of the displacement, force and torque, and finally determine the block falling disaster in the tunnel.

6. The system for detecting the block falling disaster in the tunnel based on visual and mechanical perception according to claim 5, wherein a lifting platform is arranged on the mobile platform, and the six-axis mechanical arm is arranged on the lifting platform.

7. The system for detecting the block falling disaster in the tunnel based on visual and mechanical perception according to claim 5,
wherein several auxiliary light sources are arranged on the mobile platform.

8. The system for detecting the block falling disaster in the tunnel based on visual and mechanical perception according to claim 5, wherein the control system comprises a control center and a control and operation integrated system, comprising a central control motherboard, a synchronization controller, an industrial computer, a memory, and a display; the central control motherboard is used as a core of data analysis, conversion and transmission, the memory is used to store data, and the display is used to display real-time detected image flow; the synchronization controller is used to receive a trigger signal and sensor data, meanwhile transmit the trigger signal to an image capture device to trigger the capture of images, and transmit the data to the memory; the memory is used to store the image and the sensor data; and the industrial computer is used to receive the data and store the data in the memory.

9. A working method based on the system according to claim 5, comprising the following steps:
the mobile platform moves in the tunnel, the camera devices capture images of respective positions of the inner wall of the tunnel and transmit the images to the control system, and the control system preliminarily identifies the suspected block falling disaster using the trained first neural network model;
the six-axis mechanical arm constructs a circle by taking a center of a position of the suspected block falling disaster determined in the preliminary identification process as a center of the circle, divides the circle equally through a plurality of diameters, presses against the center of the suspected block falling disaster in a pose perpendicular to the inner wall of the tunnel, moves in directions of the plurality of diameters within a range of the suspected block falling disaster, records a displacement, and acquires force and torque at the position of the suspected block falling disaster during the movement through the six-dimensional force sensor; and
the control system further judges, using the second neural network model, the suspected block falling disaster based on the recorded displacement and the acquired force and torque, and finally determines the block falling disaster in the tunnel.

10. The working method according to claim 9, wherein the method further comprises: measuring, by 3D cameras, the position of the suspected block falling disaster; calculating a distance between the end of the six-axis mechanical arm and the position of the suspected block falling disaster; and raising a lifting platform till the distance between the six-axis mechanical arm and the position of the suspected block falling disaster reaches an operation range of the six-axis mechanical arm.

11. A working method based on the system according to claim 6, comprising the following steps:
the mobile platform moves in the tunnel, the camera devices capture images of respective positions of the inner wall of the tunnel and transmit the images to the control system, and the control system preliminarily identifies the suspected block falling disaster using the trained first neural network model;
the six-axis mechanical arm constructs a circle by taking a center of a position of the suspected block falling disaster determined in the preliminary identification process as a center of the circle, divides the circle equally through a plurality of diameters, presses against the center of the suspected block falling disaster in a pose perpendicular to the inner wall of the tunnel, moves in directions of the plurality of diameters within a range of the suspected block falling disaster, records a displacement, and acquires force and torque at the position of the suspected block falling disaster during the movement through the six-dimensional force sensor; and
the control system further judges, using the second neural network model, the suspected block falling disaster based on the recorded displacement and the acquired force and torque, and finally determines the block falling disaster in the tunnel.

12. A working method based on the system according to claim 7, comprising the following steps:
the mobile platform moves in the tunnel, the camera devices capture images of respective positions of the inner wall of the tunnel and transmit the images to the control system, and the control system preliminarily identifies the suspected block falling disaster using the trained first neural network model;
the six-axis mechanical arm constructs a circle by taking a center of a position of the suspected block falling disaster determined in the preliminary identification process as a center of the circle, divides the circle equally through a plurality of diameters, presses against the center of the suspected block falling disaster in a pose perpendicular to the inner wall of the tunnel, moves in directions of the plurality of diameters within a range of the suspected block falling disaster, records a displacement, and acquires force and torque at the position of the suspected block falling disaster during the movement through the six-dimensional force sensor; and
the control system further judges, using the second neural network model, the suspected block falling disaster based on the recorded displacement and the acquired force and torque, and finally determines the block falling disaster in the tunnel.

13. A working method based on the system according to claim 8, comprising the following steps:
the mobile platform moves in the tunnel, the camera devices capture images of respective positions of the inner wall of the tunnel and transmit the images to the control system, and the control system preliminarily identifies the suspected block falling disaster using the trained first neural network model;
the six-axis mechanical arm constructs a circle by taking a center of a position of the suspected block falling disaster determined in the preliminary identification process as a center of the circle, divides the circle equally through a plurality of diameters, presses against the center of the suspected block falling disaster in a pose perpendicular to the inner wall of the tunnel, moves in directions of the plurality of diameters within a range of the suspected block falling disaster, records a displacement, and acquires force and torque at the position of the suspected block falling disaster during the movement through the six-dimensional force sensor; and
the control system further judges, using the second neural network model, the suspected block falling disaster based on the recorded displacement and the acquired force and torque, and finally determines the block falling disaster in the tunnel.

14. The working method according to claim 11, wherein the method further comprises: measuring, by 3D cameras, the position of the suspected block falling disaster; calculating a distance between the end of the six-axis mechanical arm and the position of the suspected block falling disaster; and raising the lifting platform till the distance between the six-axis mechanical arm and the position of the suspected block falling disaster reaches an operation range of the six-axis mechanical arm.

15. The working method according to claim 12, wherein the method further comprises: measuring, by 3D cameras, the position of the suspected block falling disaster; calculating a distance between the end of the six-axis mechanical arm and the position of the suspected block falling disaster; and raising a lifting platform till the distance between the six-axis mechanical arm and the position of the suspected block falling disaster reaches an operation range of the six-axis mechanical arm.

16. The working method according to claim 13, wherein the method further comprises: measuring, by 3D cameras, the position of the suspected block falling disaster; calculating a distance between the end of the six-axis mechanical arm and the position of the suspected block falling disaster; and raising a lifting platform till the distance between the six-axis mechanical arm and the position of the suspected block falling disaster reaches an operation range of the six-axis mechanical arm.

* * * * *